May 14, 1968 W. M. MACEK 3,382,760
COHERENT LIGHT FREQUENCY DIFFERENCE SENSOR
Filed July 2, 1964
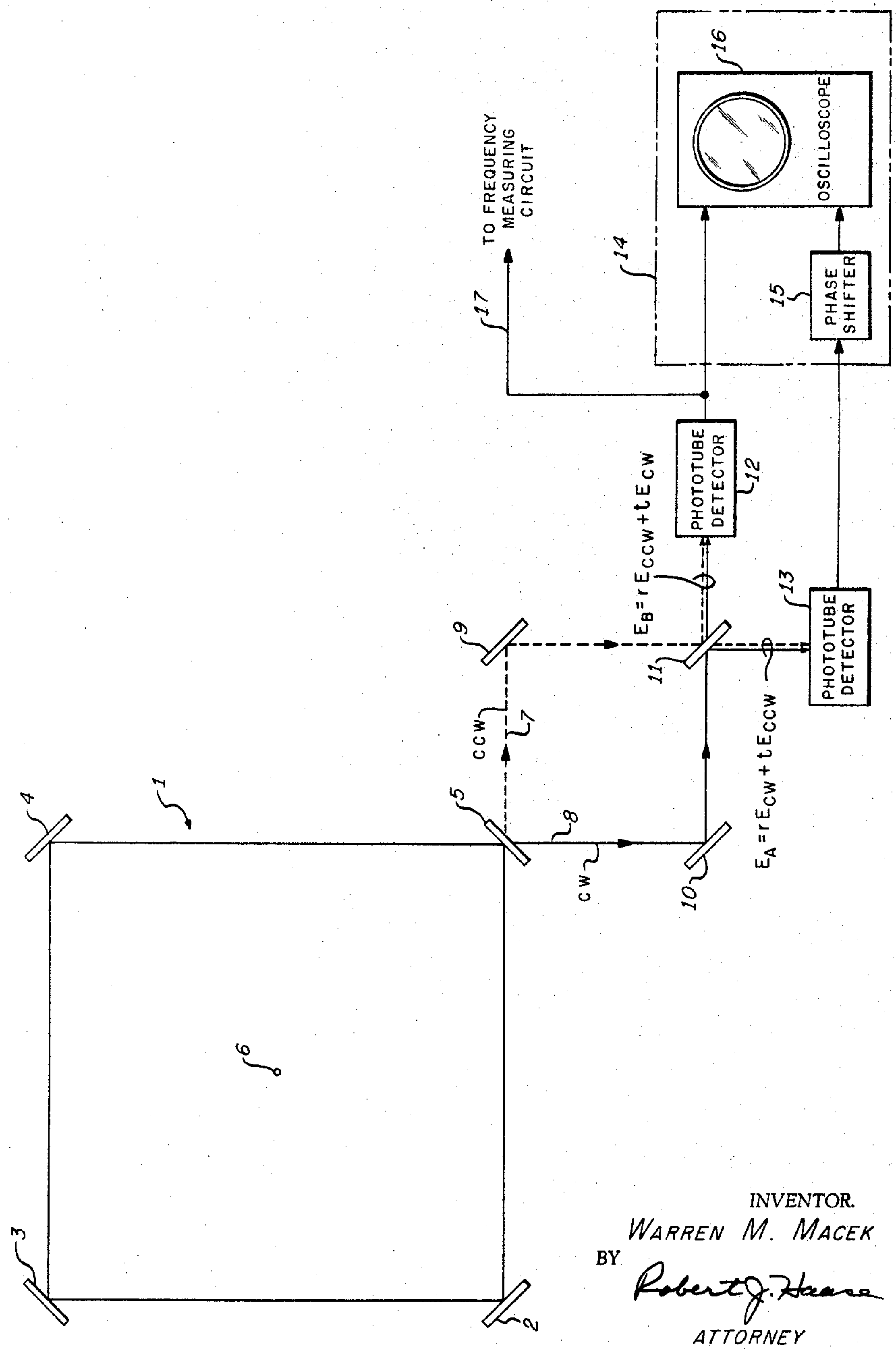

3,382,760
Patented May 14, 1968

3,382,760

COHERENT LIGHT FREQUENCY DIFFERENCE SENSOR

Warren M. Macek, Huntington Station, N.Y., assignor to Sperry Rand Corporation, Great Neck, N.Y., a corporation of Delaware Filed July 2, 1964, Ser. No. 379,914
6 Claims. (Cl. 88—14)

ABSTRACT OF THE DISCLOSURE

An apparatus for measuring the sense of the frequency difference between two light beams such as the beams issuing from a ring laser wherein the beams are applied via a beamsplitter to a pair of photodetectors. One photodetector receives the transmitted component of the first beam and the reflected component of the second beam whereas the second photodetector receives the transmitted component of the second beam and the reflected component of the first beam. The output signals from the photodetectors are applied to a phase sense determining device.

The invention herein described was made in the course of or under a contract or subcontract thereunder, with the Department of the Air Force.

The present invention generally relates to devices responsive to coherent light beams of different frequency for determining the sense of the frequency difference and, more particularly, to such a device utilizing passive and frequency drift-resistant components.

A considerable amount of attention recently has been given to velocity determining systems utilizing coherent light. For example, in the so-called "ring laser," two beams of light are caused to travel in opposite directions around a rotatable closed loop path. When the light path rotates about an axis perpendicular to the plane of the path, one of the beams travels a greater length than the other to complete one traversal of the path. The difference in the path lengths traversed by the two beams and the resulting difference in frequency between the two beams are related to the rotational velocity of the closed loop path. By extracting the counter-rotating beams from the closed loop ond heterodyning the extracted beams to obtain a beat note, the rotational velocity can be determined from the frequency of the beat note. It should be observed, however, that the sense of the rotational velocity cannot be deduced from the frequency of the beat note, the same beat frequency being produced for two equal but opposite rotational velocities. Nevertheless, the sense of rotation is implicit in the optical frequencies of the counterrotating beams; the CW beam will increase or decrease in frequency relative to the CCW beam depending on the direction of rotation.

The sense of the frequency difference between two coherent light beams is of interest also in Doppler radar utilizing optical frequency carriers. In this case, a beam of coherent light is transmitted toward an object whose reflection is compared in frequency with the transmitted light. As a result of the well known Doppler effect, the frequency of the reflection decreases for radial velocities of the target away from the transmitter, and increases for radial velocities toward the transmitter. Again, it is important to ascertain the sense of the frequency difference between the transmitted and reflected beams in order to establish the direction of the target velocity relative to the transmitter.

One solution of the problem of determining the sense of the frequency difference between two coherent light beams involves introducing a predetermined initial frequency off-set between the two beams to be frequency compared. For example, in the instance of a ring laser, a non-reciprocal phase shifter may be inserted in the path of the counter-rotating beams of light in accordance with the teaching of copending patent application Ser. No. 328,326, filed Dec. 5, 1963 in the name of Chao C. Wang and assigned to the present assignee. The non-reciprocal phase shifter produces a frequency difference or off-set between the two beams in the absence of ring laser rotation. Finite rotation in one sense about the laser rotational axis increases the frequency off-set whereas rotation in an opposite sense reduces the frequency off-set. By subtracting the known fixed off-set frequency from the frequency of the beat note resulting from the heterodyning of the two beams, both the magnitude and the direction of the ring laser rotation can be ascertained. It will be obvious to those skilled in the art that the frequency off-setting technique is also applicable to the coherent light Doppler radar case previously mentioned. By introducing a frequency off-set greater than the maximum Doppler shift (corresponding to maximum target velocity) to be encountered, the frequency of the beat note resulting from heterodyning the target reflection with the transmitted frequency unambiguously represents target velocity and direction.

The frequency off-setting technique requires the use of optical frequency devices whose stability requires close control. Naturally, any variation in the magnitude of the frequency off-set adversely effects the accuracy with which the sense of the frequency difference can be ascertained in marginal cases. Another shortcoming of the frequency off-setting technique is that the magnitude of the frequency off-set always must exceed the maximum frequency shift to be experienced in the particular system. Very high rotational rates (in the case of the ring laser) and very high target velocities (in the case of the laser Doppler radar) necessitate high frequency off-sets with concomitantly significant stabilization difficulty.

It is a principal object of the present invention to provide a stable device for determining the sense of the frequency difference between two optical carrier signals.

Another object is to determine the sense of the frequency difference between two coherent light beams without altering the frequency of either beam.

A further object is to provide a device utilizing passive, relatively drift free components for determining the sense of the frequency difference between two optical carrier signals.

These and other objects of the present invention, as will appear from the reading of the following specification, are achieved by the provision of a beam splitter, two phototube detectors, and a phase comparison circuit for processing the two input light beams whose sense of frequency difference is to be determined. In the case of the disclosed representative ring laser embodiment, the two input light beams are provided by the two counter-rotating ring laser beams of light. The two counter-rotating beams are extracted from the ring laser in a conventional manner and applied to the beam splitter. Each beam is partially transmitted through and partially reflected from the beam splitter with the transmitted component experiencing a phase delay different from the phase delay experienced by the reflected component. The reflected component of the first beam and the transmitted component of the second beam are applied to one of the phototubes. The transmitted component of the first beam and the reflected component of the second beam are applied to the other phototube. Each phototube is operative as an optical frequency heterodyne mixer and produces an output electrical signal having a frequency equal to the frequency difference between the input beams and a phase determined by the phase difference between the reflected and transmitted components at the beam splitter. The phase difference between the output electrical signals produced by the two phototubes is equal to twice the phase difference between the reflected and transmitted components at the beam splitter and is independent of the frequencies of the two input beams. The sense of the phase difference between the output electrical signals is determined by the sense of the frequency difference between the input beams which is to be ascertained.

In the disclosed embodiment, the sense of the phase difference between the phototube signals is measured by means of a phase comparison circuit comprising a fixed phase delay device and an oscilloscope. The fixed phase delay is introduced in one of the electrical output signals. The other electrical output signal and the delayed output signal are applied to the oscilloscope. By appropriate design of the beam splitter and the selection of the magnitude of the introduced phase shift, the Lissajous figure appearing on the oscolloscope may be readily interpreted in terms of the sense of the frequency difference between the two input optical carrier signals. More particularly, a first Lissajous figure appears on the oscilloscope for a first sense of frequency difference and a second Lissajous figure appears for the other frequency difference irrespective of the magnitude thereof.

For a more complete understanding of the invention, reference should be had to the following specification and to the sole drawing which is a simplified schematic diagram of the frequency difference sensor of the present invention as applied to an illustrative ring laser embodiment.

The closed loop rectangular optical path 1 is defined by corner reflectors 2, 3, 4 and 5. Two coherent light beams from a lasing medium (not shown) located along path 1 propagate in opposite directions about the closed loop optical path. The details of construction of such a ring laser are now well established in the art and are omitted from the drawing in order to avoid unnecessary digression. The details of a suitable ring laser construction are shown, for example, in application S.N. 327,920, filed Dec. 4, 1963, now abandoned for Ring Laser Rotation Rate Sensor, in the name of the present inventor and assigned to the present assignee.

Each beam of light returns to a given starting point in the path 1 after the short but measurable interval of time required to traverse the path at the finite velocity of light. If the light path is caused to rotate about axis 6 which is perpendicular to the plane of the path, the light beam travelling in the same direction as the rotation travels an effective path length which is lengthened by the distance that the assumed starting point moves while the beam completes a traversal of the path. Conversely, the beam of light travelling in the direction opposite to the path rotation travels a shorter effective path length in completing a traversal of the loop. The difference between the effective path lengths produces a frequency difference between the two counter-rotating beams whose magnitude is proportional to the path rotational velocity about axis 6.

A small portion of each of the counter-rotating beams leaves the closed optical path 1 through the partially reflecting corner mirror 5. The light beam which propagates in a counterclockwise direction about path 1 travels along path 7 behind mirror 5 while the light beam which propagates in a clockwise direction about path 1 travels along path 8 behind mirror 5. The extracted beams are redirected along the indicated paths by mirrors 9 and 10 to impinge upon beam splitter 11 at equal angles of incidence.

The reflection ($r$) and transmission ($t$) coefficients of beam splitter 11 may be represented by the expressions $$r=\frac{1}{\sqrt{2}}e^{i\phi_r}$$

and $$t=\frac{1}{\sqrt{2}}e^{i\phi_t}$$

The wave amplitudes exiting from the beam splitter and impinging upon phototube detectors 12 and 13 may be represented by the respective expressions $$E_B=rE_{ccw}+tE_{cw}$$

and $$E_A=rE_{cw}+tE_{ccw}$$

$E_{cw}$ (the light beam propogating in *cw* direction about loop 1) and $E_{ccw}$ (the light beam propagating in *ccw* direction about loop 1) are given by $$E_{cw}=A_0e^{i\omega_0 t}$$

and $$E_{ccw}=A_se^{i\omega_s t}$$

Substituting, $$E_A=\frac{A_0}{\sqrt{2}}e^{i(\omega_0 t+\phi_r)}+\frac{A_s}{\sqrt{2}}e^{i(\omega_s t+\phi_t)}$$

and $$E_B=\frac{A_s}{\sqrt{2}}e^{i(\omega_s t+\phi_r)}+\frac{A_0}{\sqrt{2}}e^{i(\omega_0 t+\phi_t)}$$

It can be shown that the net intensities of the light impinging on the photocathodes of phototubes 12 and 13, respectively, are given by the expressions:

$$I_A=\frac{A_0^2+A_s^2}{2}+A_0A_s\cos[(\omega_0-\omega_s)t+(\phi_r-\phi_t)]$$

$$I_B=\frac{A_0^2+A_s^2}{2}+A_0A_s\cos[(\omega_0-\omega_s)t-(\phi_r-\phi_t)]$$

From the above expressions for the net intensities of the light impinging on the phototubes, it can be seen that each of the consequent photocurrents includes an alternating signal component at the same frequency $(\omega_0-\omega_s)$. At any instant of time, photocurrent B is leading by $(\phi_r-\phi_t)$ and photocurrent A is lagging by the same amount if $\omega_0$ is greater than $\omega_s$. However, if $\omega_0$ is less than $\omega_s$ (as a result of the rotation of the ring laser in an opposite sense), photocurrent B would lag by $(\phi_r-\phi_t)$ while photocurrent A would lead by the same amount. It should be noted that the magnitude of the phase difference between the photocurrents at the outputs of detectors 12 and 13 is a function only of the reflection and transmission characteristics of beam splitter 11 and is independent of the frequency of the light beams propagating along paths 7 and 8. Thus, for a given beam splitter, the magnitude of the phase difference remains constant at a value of $2(\phi_r-\phi_t)$ but reverses in sense upon a reversal in the sense of the frequency difference of the two light beams propagating along paths 7 and 8. It should also be noted that the origin of the two light beams propagating on paths 7 and 8 is not significant to the present invention. The input light beams whose sense of frequency difference is to be determined may be derived as described from a rotating ring laser or, for example, from the transmitted and reflected light beams in an optical Doppler radar.

The sense of the phase difference between the photocurrents at the outputs of detectors 12 and 13 is ascertained by phase comparison circuit 14 comprising phase shifter 15 and oscilloscope 16. Phase shifter 15 is employed merely to avoid the necessity of determining the direction in which the Lissajous figure is traced on the screen of oscilloscope 16 in order to ascertain the sense of the phase difference between the photocurrents. As is well known in the art, identically shaped and oriented Lissajous figures result from mere reversals in the sense of the phase difference between two equal frequency alternating signals applied to the orthogonal deflection means. This handicap, however, may be removed by the introduction of a predetermined phase delay in one of the photo-currents prior to its application to oscilloscope. The predetermined phase delay is introduced in the disclosed embodiment in the photocurrent at the output of detector 13 by means of phase shifter 15.

The circuit designer may exercise wide discretion in the selection of the amount of phase shift introduced by phase shifter 15. In general, the amount selected must be such that when added to equal and opposite amounts of phase shift $[\pm 2(\phi_r - \phi_t)]$, two distinguishable resultants are produced. For example, assuming that the reflection and transmission characteristics of beam splitter 11 are such that the quantity $\pm 2(\phi_r - \phi_t)$ equals $\pm 90°$ and that phase shifter 15 is designed to introduce the phase delay of 90° in the photo-current applied thereto, the following relationships obtain: For a first sense of frequency difference between the two input light beams, a phase difference of 0° is produced between the two photocurrents at the inputs of phase comparison circuit 14. For the other sense of frequency difference between the two input light beams, a phase difference of 180° is produced between the two photocurrents at the inputs of phase comparison circuit 14. If, as suggested, phase comparison circuit 14 is an oscilloscope, two easily distinguishable straight-line Lissajous figures of opposite slope are produced to represent the respective photocurrent phase differences. Any other conventional phase comparison means may be substituted for phase shifter 15 and oscilloscope 16 to determine the sense of the phase difference between the photocurrents from detectors 12 and 13.

The reflection and transmission characteristics of the beam splitter 11 depends upon the nature of the material used. A relative phase of 180° obtains between the reflected and transmitted components if a dielectric beam splitter is employed. In the case of a metallic beam splitter (wherein the reflecting coating is metallic), the relative phase between the reflection and transmission characteristics depends upon the conductivity and thickness of the deposited metal and the angle of incidence of the impinging light beam.

Although the indication produced by phase comparison circuit 14 represents solely the sense of the frequency difference between the two input light beams travelling along paths 7 and 8, as desired, the magnitude of the frequency difference may also be determined readily simply by measuring the frequency of the photocurrent at the output of the phototube detector 12 or at the output of phototube detector 13. This is suggested by output line 17.

While the invention has been described in its preferred embodiments, it is to be understood that the words which have been used are words of description rather than limitation and that changes within the purview of the appended claims may be made without departing from hte true scope and spirit of the invention in its broader aspects.

What is claimed is:

1. Apparatus for determining the sense of the frequency difference between two light beams of different frequency comprising one beam splitter, means for directing said beams solely upon said one beam splitter, each said beam being partially transmitted through and partially reflected from said beam splitter with the phase delay experienced by the transmitted beam component being different from the phase delay experienced by the reflected beam component, first and second optical frequency heterodyne mixers, the reflected component of one beam and the transmitted component of the other beam being applied to said first mixer, the transmitted component of said one beam and the reflected component of said other beam being applied to said second mixer, each mixer producing an output signal having a frequency equal to the frequency difference between the beam components applied thereto, and means connected solely to said mixers for determining the sense of the phase difference between the output signals provided by said mixers.

2. Apparatus for determining the sense of the frequency difference betwen two coherent light beams of different frequency comprising one beam splitter, means for directing said beams solely upon said one beam splitter at equal angles of incidence, each said beam being partially transmitted through and partially reflected from said beam splitter with the phase delay experienced by the transmitted beam component being different from the phase delay experienced by the reflected beam component, first and second optical frequency heterodyne mixers, the reflected component of one beam and the transmitted component of the other beam being applied to said first mixer, the transmitted component of said one beam and the reflected component of said other beam being applied to said second mixer, each mixer producing an output signal having a frequency equal to the frequency difference between the beam components applied thereto, and means connected solely to said mixers for determining the sense of the phase difference between the output signals provided by said mixers.

3. Apparatus as defined in claim 2 wherein said first and second optical frequency heterodyne mixers respectively comprise first and second phototube detectors.

4. Apparatus for determining the sense of the frequency difference between two coherent light beams of different frequency comprising one beam splitter, means for directing said beams solely upon said one beam splitter at equal angles of incidence, each said beam being partially transmitted through and partially reflected from said beam splitter with the phase delay experienced by the transmitted beam component being different from the phase delay experienced by the reflected beam component, first and second phototube detectors, the reflected component of one beam and the transmitted component of the other beam being applied to said first detector, the transmitted component of said one beam and the reflected component of said other beam being applied to said second detector, each detector producing an output signal having a frequency equal to the frequency difference between the beam components applied thereto, a fixed phase delay device, and an oscilloscope having a pair of orthogonal deflection means, one of said output signals being applied by said device solely to one of said orthogonal deflection means, and the other of said output signals being applied solely to the other of said orthogonal deflection means.

5. In a ring laser producing a pair of counter-rotating coherent light beams whose difference in frequency is determined by the velocity of rotation of said ring about an axis perpendicular to the plane of said ring, means for determining the sense of said difference in frequency comprising one beam splitter, means for extracting portions of said counter-rotating beams from said ring and for directing the extracted beam portions solely upon said one beam splitter, each said extracted beam portion being partially transmitted through and partially reflected from said beam splitter with the phase delay experienced by the transmitted beam component being different from the phase delay experienced by the reflected beam component, first and second optical frequency heterodyne mixers, the reflected component of one beam portion and the transmitted component of the other beam portion being applied to said first mixer, the transmitted component of said one beam portion and the reflected component of said other beam portion being applied to said second mixer, each mixer producing an output signal having a frequency equal to the frequency difference between the beam components applied thereto, and means connected solely to said mixers for determining the sense of the phase difference between the output signals provided by said mixers.

6. Apparatus for determining the sense of the frequency difference between two coherent light beams of different frequency comprising one beam splitter, means for directing said beams solely upon said one beam splitter at equal angles of incidence, each of said beam being partially transmitted through and partially reflected from said beam splitter with the phase delay experienced by the transmitted beam component being different from the phase delay experienced by the reflected beam component, first and second optical frequency heterodyne mixers, the reflected component of one beam and the transmitted component of the other beam being applied to said first mixer, the transmitted component of said one beam and the reflected component of said other beam being applied to said second mixer, each mixer producing an output signal having a frequency equal to the frequency difference between the beam components applied thereto, a fixed phase delay device, an oscilloscope having a pair of orthogonal deflection means, one said output signal being applied by said device solely to one of said orthogonal deflection means, and the other said output signal being applied solely to the other of said orthogonal deflection means.

References Cited

UNITED STATES PATENTS 3,320,850 5/1967 Oliver ---------------- 88—14

OTHER REFERENCES

Rosenthal, A. H.: Regenerative Circulatory Multiple-Beam Interferometry for the Study of Light Propogation Effects, Journal of Optical Society of America, vol 52, No. 10, October 1962.

JEWELL H. PEDERSEN, *Primary Examiner.*

B. LACOMIS, *Assisting Examiner.*